INVENTOR.
JOHN P. McGOWAN
BY
J. R. NELSON &
W. A. SCHAICH
ATTORNEYS

United States Patent Office 3,070,982
Patented Jan. 1, 1963

3,070,982
GLASS SHAPING TOOLS COATED WITH NICKEL PHOSPHORUS ALLOY
John P. McGowan, Toledo, Ohio, assignor to Owens-Illinois Glass Company, a corporation of Ohio
Filed Aug. 7, 1957, Ser. No. 676,848
7 Claims. (Cl. 65—374)

This invention relates to improvements in tools for shaping articles of glass wherein molten glass is deposited in a part of the shaping tool and worked therein to the defined shape of the article by either pressing or blowing or a combination of pressing and blowing.

Glass shaping tools are generally constructed of iron, steel or steel alloy and their glass contacting surfaces are highly polished to the finish necessary to give the formed glass article a smooth surface finish and allow release of the glass from the tool after it is shaped and sufficiently cooled. Other parts of the tool which are not in contact with the glass transmit heat during the shaping operation and this heat is removed from the exterior of the shaping tool by a cooling medium. Ferrous metals have a tendency towards surface oxidation which sets up a layer of rust and corrosion on the surface of the tool. This oxidation changes the thermal conductivity of the tool. Oxidized portions of the glass shaping tool tend to establish a heat transmitting barrier which is uncontrollable. Also, oxidation on the glass contacting surfaces tends to accelerate wear. After the tool is worn considerably it is no longer useful until the surface has been restored to the operating tolerance of the article being formed.

It is important during manufacturing operations that the designed heat transmission rate for cooling of the tool be uniformly maintained. Oxidation change in the metal of the tool resulting in change of heat conductivity must be minimized to maintain uniformity of the glass article being formed.

Additionally, it is important that the glass contacting surfaces be highly polished in order that they give the desired glass finish and have the desirable glass release properties. The glass contacting surface of the tool must have sufficient hardness to withstand wear and abrasion.

It is accordingly an object of this invention to provide an improved glass shaping tool having these desirable characteristics in which the glass contacting surfaces are of laminate construction of a plated metal capable of preventing oxidation and acquiring a polished surface finish without the necessity of mechanically working or polishing it.

Another object of the invention is to provide such a tool with a plating of nickel phosphor alloy applied by a chemical reduction process and hardened by heat treatment to a hardness not otherwise attainable in plated articles of this nature used heretofore.

Another object of the invention is fabrication of the aforementioned improved glass forming tool by more simple and economical process.

A further object of the invention is to provide glass forming tools having the aforementioned advantageous characteristics, including increased operating life and adaptable to more efficient and economical restoration of worn glass working surfaces.

Other objects and advantages will be apparent from the following description.

Figure 1:
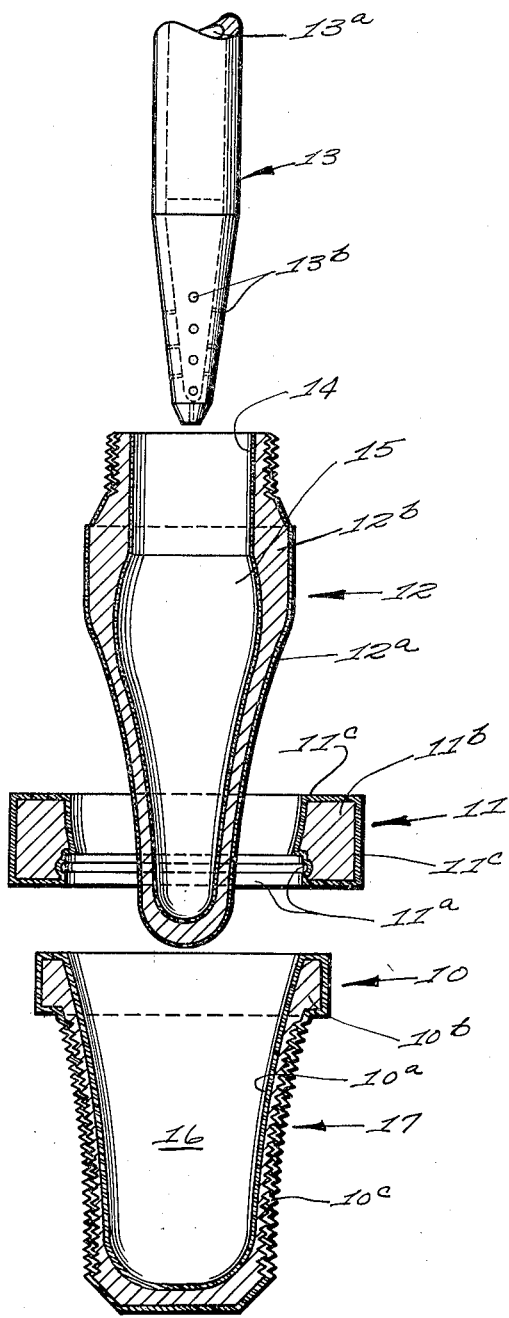
FIG. 1 is an exploded sectional elevational view of one form of glass shaping tool consisting of cooperating mold, neck ring and plunger parts utilized in pressing a blank or parison in the shaping operation of a press and blow machine for producing glass containers.

The glass forming tools illustrated herein are the blank mold assembly, including pressing plunger and finishing blow mold which are utilized in present press and blow-type machines for manufacture of glass containers. It should become apparent, however, that the invention is not limited to this particular type or combination of glass forming tools.

Referring to the drawings, a form of glass shaping tools will now be described to which the present invention is adapted.

In FIG. 1, is shown a unitary blank mold 10, neck ring 11 and a pressing plunger 12. Plunger 12 is provided with an internal cooling nozzle 13 through which a cooling medium, such as air or water, is provided internally of the plunger when plunger and nozzle are assembled (as shown on FIG. 2). The cooling medium is introduced axially in opening 13a of nozzle 13 and exits through openings 13b arranged about the tip portion of nozzle 13.

The above-mentioned three parts 10, 11 and 12 are each formed of a laminate construction. The interior surface of plunger 12 which receives the cooling medium from nozzle 13 is provided with an oxidation resistant plating 14 of an alloy which will be presently described. The exterior surface of the plunger 12, which contacts the molten glass during the pressing operation, is similarly plated with an oxidation resistant alloy at its laminate surface 12a.

The neck ring defines the container neck finish at glass contacting surface 11a and is plated over its central laminate portion 11b. Thus, the plated surface 11a becomes the glass contacting surface in neck ring 11. The plating on central laminate portion 11b is provided, as shown, to envelope the exterior surfaces of central laminate portion 11b.

The blank mold 10 is provided with a parison defining cavity 16 and is of laminate construction consisting of an interiorly plated surface 10a over a central laminate portion 10b. The exterior surface of blank mold 10 is provided with vertically annular cooling fins 17. The outer surface of the blank mold, as shown, is similarly provided with a plating 10a so that the central laminate portion of the mold is entirely enveloped with a plated laminate.

Figure 2:
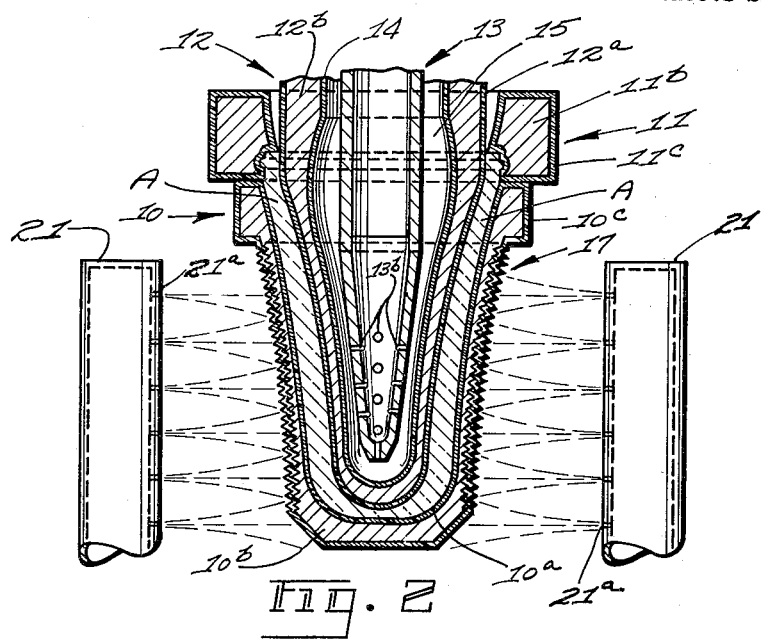
FIG. 2 is a sectional elevational view of the parts depicted in FIG. 1, showing them in operating position for pressing a blank or parison shape of glass and includes schematically an application of a cooling medium exteriorly to the shaping mold.

In FIG. 2 the parts just described are shown in operative position for pressing a blank or parison of glass A in the molding cavity of blank mold 10 and a neck finish conforming to outline 11a of neck ring 11. The neck ring 11 and blank mold 10 are in register and adjacent near the upper open end of the molding cavity of blank mold 10. A cooling medium is being applied by cooling nozzles 21 through vertically arranged nozzle openings 21a.

Figure 3:
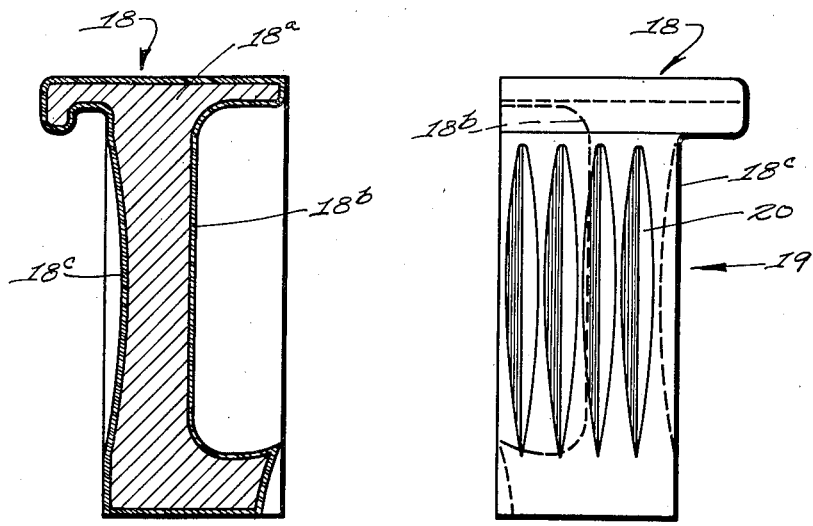
FIG. 3 is an elevational view, partly in section, showing another form of glass shaping tool consisting of parted complementary mold halves of a blow mold utilized in blow forming a finish shape of glass container from the blank or parison shape formed in the blank mold and transferred therefrom.

After the parison has been formed by the pressing operation in blank mold 10, the plunger 12 is withdrawn and the neck ring 11 holding the glass parison A is lifted and transferred to position for inserting the parison A between the open halves 18 of blow mold 19, shown in FIG. 3. While at that position, the mold halves 18, which are shown open, are closed about the parison A. A blowing tool (not shown) is then placed in register over the opening at neck ring 11 and the parison A is blown to the form of a finish container in mold 19.

The blow mold 19 represents another form of glass shaping tool and is fabricated of laminate construction having a central laminate 18a over which is plated a laminate 18b being the glass contacting surface of the mold. The exterior surface over the central laminate portion 18a is formed by plating a laminate plating 18c so that the entire mold is enveloped with a plated surface. Cooling fins 20 are machined longitudinally on the sides at the exterior of the central laminate portion 18a of each mold half 18 to provide additional cooling surface to central mold temperatures.

The method of fabricating the glass forming tool and the materials found to be most satisfactory will now be described. It is preferred that the main body of the tool and the central laminate portions such as 10b, 11b and 18a, be first formed by casting or machining to shape from cast iron. Since this body portion of the tool will comprise the bulk of the material used, cast iron is especially desirable in that it is more economical material then steel or steel alloys, yet it provides sufficient strength to the tool during use.

The formed tool body is then plated with a laminate coating of oxidation resistant alloy. It is preferred that a nickel phosphorus alloy be used and is applied by an autocatalytic chemical reduction process disclosed in detail in U.S. Patent No. 2,532,283, issued to Abner Brenner and Grace E. Riddell entitled "Nickel Plating by Chemical Reduction."

The tool today to be plated is submersed in a bath of nickel chloride or nickel sulphate mixed with sodium hypophosphite. The bath is established at a pH value between 3.24 and 5.8 by the addition of a basic solution such as sodium hydroxide (NaOH). This solution is added for adjusting pH after the bath solution is made up. The plating process is conducted at a temperature in the range of between 185° and 195° F. The solution during the plating operation is maintained as an acid bath and which has, by way of the two examples given, the following compositions:

I

| | Percent |
|---|---|
| Nickel chloride solution ($NiCl_2 \cdot nH_2O$) | 5 |
| Sodium hypophosphite ($NaH_2PO_2 \cdot H_2O$) | 10–15 |
| Buffer solution | 15 |
| Water | 65–70 |
| Sodium hydroxide (NaOH). | |

II

| | Percent |
|---|---|
| Nickel sulphate solution ($NiSO_4 \cdot nH_2O$) | 5 |
| Sodium hypophosphite ($NaH_2PO_2 \cdot H_2O$) | 10–15 |
| Buffer solution | 15 |
| Water | 65–70 |
| Sodium hydroxide (NaOH). | |

An example of the buffer solution indicated above is sodium hydroxyacetate ($NaC_2H_3O_2$).

The thickness of the plating varies as a relation of the time of submersion left in the bath. With this plating process, the tool body may be plated to finished dimension which eliminates necessity of machining and polishing. The plated surface has a degree of smoothness to give excellent glass release properties at the glass contacting surface during operation.

It is possible also to plate the glass contacting surfaces of the tool such as at 10a, 11a, 12a and 18b (FIGS. 1 and 3) slightly oversize and later polish them to tolerance and a smooth finish. This technique is advantageous for restoring the operating laminate surface of the tool after excessive wear reduces it beyond operating tolerances of the glass contacting surface dimensions.

After the plating has been applied the glass forming tool is then placed in a heat treating oven which is maintained at temperatures in the range of 700–800° F. The tool is then treated for approximately 1 hour duration. After heat treatment the tool is removed and air cooled.

It is essential to this invention to plate at least the glass contacting surfaces of the forming tool and if this is desirable the remaining portions of the tool body may be masked off prior to plating. However, it is less costly and more convenient to plate the entire part of the tool.

This process presents a considerable advantage in cost and convenience over the electrolytic plating process. Electrolytic plating requires that the anode conform to the shape of the plated surface such as the mold cavity or plunger cooling chamber in order to provide a uniform coating. In addition, however, the electrolytic plating process, when followed by similar heat treatment, yields a Rockwell hardness of the plated surface of about 52 Rc. On the other hand, the plating applied by the chemical reduction process, above described, followed by heat treatment in the manner just specified yields a Rockwell hardness of between 65 and 70 Rc.

It has been found that the glass release properties and finish characteristics of the plated metal laminate, as indicated by the finished glass article appear superior over those heretofore obtained by conventional glass working tools.

The plating deposited on the tool body from the chemical reduction in the above bath composition results in a nickel alloy composed of nickel and phosphorus, the phosphorus content being within the range of 7 to 13%. This alloy composition has excellent oxidation resistant properties and is a good conductor of heat.

The thermal conductivity of glass tool walls in total, as considering all the laminate sections, may be selected for a particular glass forming operation by selection of materials for forming the tool body having various thermal conductivities. Other variable features which may be controlled within limits are the selected thickness of plating to be applied and the corresponding cross-sectional dimension of the tool body.

In addition to the features just described herein for the invention, the fabrication of the tool permits plating in accessible areas readily and uniformly. Since molten glass is highly abrasive, wear is to be expected on the glass contacting surfaces of the forming tool. By the process just described, worn tools may be replated and refinished to the required tolerances and finished efficiently and economically. This is an especially significant advantage in the glass container forming process in that the requirements of close forming tolerances must be held especially at the neck finishes of the container.

Various modifications may be resorted to within the spirit and scope of the appended claims.

I claim:

1. A glass molding member constructed to define at least a portion of the glass contacting surface of a molded glass article, for shaping molten glass thereby comprising a wall structure of cast iron, and a metal alloy formed thereon as a chemical reduction coating providing the glass contacting surface of the member, said metal alloy consisting essentially of nickel-phosphorus, wherein the phosphorus content is in the range of about 7–13%, said glass contacting surface being polished.

2. A glass shaping member for shaping molten glass comprising a wall structure of a ferrous metal forming the body portion of the shaping member and a coating thereon, the coating providing the glass contacting surface of the shaping member, said coating being formed as a chemical reduction plating of nickel-phosphorus, the phosphorus being in the range of about 7–13%.

3. The glass shaping member of claim 2, wherein the glass contacting surface is polished.

4. The glass shaping member of claim 2, wherein the coating of said nickel-phosphorus envelops the metallic body portion.

5. The glass shaping member of claim 2, which is constructed as a glass shaping mold.

6. A glass shaping member constructed to define at least a portion of a molded glass article for shaping molten glass thereby, comprising a wall structure of a ferrous metal and a metal alloy formed thereon by chemical reduction plating providing the glass contacting surface, of the member, said metal alloy consisting essentially of nickel-phosphorus, wherein the phosphorus content is in the range of about 7–13%.

7. A glass shaping member constructed to define at least a portion of a molded glass article for shaping molten glass thereby, comprising a wall structure of a ferrous metal material forming a base portion of the member, and a metal alloy formed thereon as a chemical reduction plating of nickel-phosphorus, wherein the phosphorus content is in the range of 7–13%, said metal alloy providing the glass contacting surface of the member.

References Cited in the file of this patent

UNITED STATES PATENTS

| | | | |
|---|---|---|---|
| 285,058 | Nickerson | Sept. 18, | 1883 |
| 489,011 | Joyce | Jan. 3, | 1893 |
| 876,212 | Miller | Jan. 7, | 1909 |
| 1,321,306 | Henderson | Nov. 11, | 1919 |
| 1,575,122 | Madsen | Mar. 2, | 1926 |
| 1,965,242 | Kelly | July 3, | 1934 |
| 2,212,984 | Greed | Aug. 27, | 1940 |
| 2,217,802 | Koehring | Oct. 15, | 1940 |
| 2,326,730 | Kelly et al. | Aug. 10, | 1943 |
| 2,349,920 | Welcome | May 30, | 1944 |
| 2,445,858 | Mitchell et al. | July 27, | 1948 |
| 2,532,283 | Brenner et al. | Dec. 5, | 1950 |
| 2,550,140 | Dotson | Apr. 24, | 1951 |
| 2,633,631 | Horvitz | Apr. 7, | 1953 |
| 2,662,347 | Giffen | Dec. 15, | 1953 |
| 2,688,823 | Weber | Sept. 14, | 1954 |
| 2,717,218 | Talmey et al. | Sept. 6, | 1955 |
| 2,819,187 | Gutzeit et al. | Jan. 7, | 1958 |
| 2,819,188 | Metheny et al. | Jan. 7, | 1958 |
| 2,908,568 | Crehan et al. | Oct. 13, | 1959 |

FOREIGN PATENTS

| | | |
|---|---|---|
| 604,373 | France | Jan. 25, 1926 |